United States Patent
Reinfried et al.

(10) Patent No.: US 8,405,629 B2
(45) Date of Patent: Mar. 26, 2013

(54) TOUCH SENSOR CONFIGURATION

(75) Inventors: Nikolaus Reinfried, Lechaschau (AT); Bruce Tseng, Taipei County (TW); Jörg Winkler, Reutte (AT)

(73) Assignee: Plansee SE, Reutte (AT)

( * ) Notice: Subject to any disclaimer, the term of this patent is extended or adjusted under 35 U.S.C. 154(b) by 226 days.

(21) Appl. No.: 13/026,431

(22) Filed: Feb. 14, 2011

(65) Prior Publication Data

US 2011/0199341 A1 Aug. 18, 2011

(30) Foreign Application Priority Data

Feb. 12, 2010 (AT) .............................. GM 77/2010 U (51) Int. Cl.
*G02F 1/335* (2006.01)

(52) U.S. Cl. ......................................... 345/173; 428/1.1

(58) Field of Classification Search .................. 345/176; 428/1
See application file for complete search history.

(56) References Cited

U.S. PATENT DOCUMENTS

| | | | |
|---|---|---|---|
| 5,150,233 A | | 9/1992 | Enomoto et al. |
| 5,614,731 A | * | 3/1997 | Uchikoga et al. ............... 257/59 |
| 2009/0096759 A1 | | 4/2009 | Nishiwaki et al. |
| 2009/0160824 A1 | * | 6/2009 | Chih-Yung et al. ........... 345/175 |

FOREIGN PATENT DOCUMENTS

EP 0444580 A2 9/1991

OTHER PUBLICATIONS

Austrian Search Report dated Jan. 14, 2011.

* cited by examiner

*Primary Examiner* — Amare Mengistu
*Assistant Examiner* — Shawna Stepp Jones
(74) *Attorney, Agent, or Firm* — Laurence A. Greenberg; Werner H. Stemer; Ralph E. Locher (57) ABSTRACT

A touch sensor configuration contains an optically transparent substrate, at least one optically transparent touch sensor element formed on the substrate and has at least one electrically conductive, transparent layer, and at least one contacting structure for the electrical contacting of the electrically conductive, transparent layer. The contacting structure has in direct contact with the electrically conductive, transparent layer at least one layer of $Mo_xTa_y$ with $0.02 \leq y \leq 0.15$.

12 Claims, 3 Drawing Sheets

TOUCH SENSOR CONFIGURATION

CROSS-REFERENCE TO RELATED APPLICATION

This application claims the priority, under 35 U.S.C. §119, of Austrian application GM 77/2010, filed Feb. 12, 2010; the prior application is herewith incorporated by reference in its entirety.

BACKGROUND OF THE INVENTION

Field of the Invention

The present invention relates to a touch sensor configuration.

Touch sensors are being used increasingly frequently in electronic devices. In particular, in recent years touch sensors have often been used as an intuitive-to-operate, user-friendly interface for entering information into navigation systems, personal digital assistants (PDA), portable minicomputers, cell phones, PC systems, copiers, etc. In many cases, the touch sensor or a configuration of a plurality of touch sensors is arranged over a display unit, which may be formed for example by a screen, such as for example an active-matrix liquid-crystal screen (TFT-LCD, thin film transistor liquid crystal display). The touch sensor or the touch sensor configuration is in this case often formed in such a way that a user can communicate with the electronic device by touching it with a finger, a tracer or some other object.

In this respect, various measuring principles are known for determining the touching point on a surface of the touch sensor or the touch sensor configuration. The various measuring principles are also used for classifying the various types of touch sensors or touch sensor configurations. For example, a distinction is made between resistance sensing (resistive sensing), capacitive sensing, acoustic sensing, optical sensing (for example in the visible range or in the infrared range) and sensing by electromagnetic induction (inductive sensing). Most of the touch sensors or touch sensor configurations that are on the market use resistive or capacitive sensing for determining the position of the touching point. A capacitive touch sensor configuration has two electrically conductive layers, applied to an electrically insulating substrate. The two electrically conductive layers may, for example, be applied to the opposite surfaces of the substrate, at least substantially over their full area, or just to one side of the substrate. If applied to only one side of the substrate, the layers may, for example, be arranged next to one another in a grid configuration or one above the other, separated by an electrically insulating layer.

In the case of a configuration over a display unit, the touch sensor or the touch sensor configuration must be of an optically transparent form (at least to the greatest extent), in order that the user can see the display unit.

It is known in the case of such touch sensors to provide electrically conductive, transparent layers as electrodes of touch sensor elements. The electrically conductive and optically transparent layers concerned are, for example, in many cases produced from a transparent conductive oxide (TCO, transparent conducting oxide), such as for example indium tin oxide (ITO), indium zinc oxide (IZO), aluminum zinc oxide (AZO) or antimony tin oxide, an electrically conductive polymer film or a similar material.

U.S. patent publication No. 2009/0096759 A1 describes a touch sensor configuration on a screen. It describes touch-sensitive screens in which an optically transparent touch electrode is arranged on an insulating substrate and a touching position on the touch electrode is determined by electrical signals. In the first to third embodiments, a touch sensor configuration of the capacitive type (capacitance sensing) is described, and in further embodiments a touch sensor configuration of the resistive type (resistance sensing) is described.

U.S. patent publication No. 2009/0160824 A1 describes a two-dimensional sensor structure for a touch-sensitive screen of the capacitive type. A plurality of optically transparent touch sensor elements are provided, arranged in a grid on a screen (with different positions in a first direction and a second direction perpendicular thereto). The optically transparent touch sensor elements are electrically contacted by a metallic contacting structure. The metallic contacting structure is in this case applied as a layer to an insulating glass substrate.

To make it possible to sense touch signals or position signals, in the various touch sensor configurations described above the electrically conductive, transparent layers must be electrically connected to an evaluation unit. To obtain a touch sensor configuration provided with the desired properties with respect to measuring accuracy and measuring speed, the electrical connection to the evaluation unit usually takes place by way of a metallic contacting structure, which has a higher conductivity (usually by 2 to 3 orders of magnitude) than the electrically conductive, transparent layers of the electrodes of the touch sensor. Metallic conductor tracks are usually used in this respect. The electrically conductive, transparent layers and the contacting structure are usually coated with a transparent, non-conducting protective layer, which is intended to protect the sensor layers lying thereunder from corrosion, moisture, perspiration, contaminants and damage, for example caused by scratches. Both the application of the thin electrically conductive, transparent layers and the application of the contacting structure usually take place by way of cathode sputtering and deposition on the substrate. The creation of the touch sensor configuration usually involves a structuring of the individual layers by way of photolithography in combination with a wet-chemical etching process. The passivation layer (protective layer) is usually deposited by chemical vapor deposition (CVD) and structured by wet or plasma etching.

In the production of such touch-sensitive configurations by way of layer depositing processes, a further problem occurs in particular in the case of substrates with a large area, such as for example in the production of large-area touch-sensitive screens. When depositing the contacting structures and the electrically conductive, transparent layers, different tensile stresses or compressive stresses occur in a plane parallel to the substrate surface on account of different coefficients of thermal expansion and on account of further parameters of the depositing process (in particular the pressure of the working gas and the substrate temperature in the case of cathode sputtering) in the region of the substrate and the layers applied thereto. These differences in stress may, for example, thereby cause an upward distortion of the substrate, which leads to undesired effects, particularly in the case of large-area touch-sensitive screens. In extreme cases, this may even lead to destruction of the substrate. Furthermore, these effects may cause the contacting structures to undergo undesired deformation. With excessive tensile stresses, cracks may occur in the layer, with excessive compressive stresses upward distortions or folding may occur. For example, when aluminum or aluminum alloys are used as the material for the contacting structures, so-called hillocks form, i.e. undesired deformations of the surface of the contacting structure. In a subsequent step of the production process, these may cause poorer layer formation or layer coverage and further problems, such as for example a short circuit of the touch sensor. When aluminum or aluminum alloys are used for the contacting structure, furthermore, special measures have to be taken to provide electrical contacting with a low transfer resistance in relation to the electrically conductive, transparent layers.

Particularly in the case of portable devices, such as for example cell phones, PDAs, navigation devices and the like, during operation the touch sensor or the touch sensor configuration is exposed to high stress due to environmental influences (corrosion, moisture, perspiration, etc.). Furthermore, due to the often very thin protective layer, which is usually only a few micrometers thick, sometimes oxidizing substances (for example oxygen, etc.) can diffuse through and react with the layers located thereunder. This can cause damage to the metallic contacting structure by corrosion or oxidation. This damage may lead to changing of the electrical conductivity (usually a deterioration) of the contacting structure, which in turn may result in errors in the determination of the touching position. In extreme cases, it may cause a complete electrical interruption of the contacting structure.

The contacting structure in the case of such touch sensor configurations must therefore meet many different requirements. The material of the contacting structure must on the one hand be good in terms of being worked in an etching process during production, i.e. be good in terms of being etched, or have a good etching behavior, and on the other hand have a high corrosion resistance and resistance to external influences in the application of the touch sensor configuration. Furthermore, the contacting structure must have a relatively high electrical conductivity and a low transfer resistance in relation to the respective electrically conductive, transparent structure. In addition, undesired effects caused by different tensile stresses and compressive stresses in the individual layers must be kept as small as possible or be compensated.

SUMMARY OF THE INVENTION

It is accordingly an object of the invention to provide a touch sensor configuration which overcomes the above-mentioned disadvantages of the prior art devices of this general type.

With the foregoing and other objects in view there is provided, in accordance with the invention a touch sensor configuration. The touch sensor configuration contains a contacting structure for an electrical contacting of an electrically conductive, a transparent layer that achieves a most advantageous possible etching behavior with at the same time good corrosion resistance and other resistance, highest possible electrical conductivity with lowest possible transfer resistance as well as avoidance as completely as possible of disadvantageous influences caused by mechanical stress gradients in the individual layers.

The touch sensor configuration has an optically transparent substrate, at least one optically transparent touch sensor element, which is formed on the substrate and has at least one electrically conductive, transparent layer, and at least one contacting structure for the electrical contacting of the electrically conductive, transparent layer. The contacting structure has in direct contact with the electrically conductive, transparent layer at least one layer of $Mo_xTa_y$ with $0.02 \leq y \leq 0.15$.

"Touch" or "touching" is understood here as meaning not only direct touching, with direct physical contact, but also when an object is brought into the direct vicinity of a sensor element in such a way that the latter can sense it approaching. A touch sensor configuration is understood here as meaning a configuration which makes it possible to sense when a touch sensor element is touched with a finger, a tracer or some other object or the latter is at least brought into the direct vicinity of the touch sensor element. In particular, the touch sensor element may be configured, for example, for resistive or capacitive sensing, as described at the beginning. The touch sensor configuration may, in particular, be formed as an interface for entering information into an electronic device, in particular in such a way that a user can communicate with the electronic device by touching it with a finger, a tracer or some other object.

Optically transparent or transparent is understood here as meaning that the respective layers or structures are transparent, at least to the greatest extent, to light in the visible range, so that the light in the visible range can pass through unhindered, at least to the greatest extent.

The designation $Mo_xTa_y$ with $0.02 \leq y \leq 0.15$ generally means an alloy where: $x+y=1$. The figures given for x and y in the present description always refer to atomic percent. However, it should be noted that this does not have to be $Mo_xTa_y$ of the highest purity, but that impurities with other elements may be present. At least one layer of $Mo_xTa_y$ is understood here as meaning that the contacting structure may also have in addition to the layer of $Mo_xTa_y$ one or more further layers of one or more other materials, or else a number of layers of $Mo_xTa_y$ may be provided, possibly in combination with one or more other layers. However, it is also possible to produce the contacting structure exclusively from $Mo_xTa_y$, since this has a high electrical conductivity. In this case, a simplified layer structure is provided—in comparison with known touch sensor configurations, in which the contacting structure is formed from a number of layers of different materials.

Since the contacting structure in direct contact with the electrically conductive, transparent layer has at least one layer of $Mo_xTa_y$ with $0.02 \leq y \leq 0.15$, the contacting structure has a low electrical resistance and, in particular, a low transfer resistance is provided in relation to the electrically conductive, transparent layer. It has also been found that the layer of $Mo_xTa_y$ with $0.02 \leq y \leq 0.15$ exhibits a particularly advantageous etching behavior during production, i.e. is good in terms of being etched in a wet-chemical etching process, but on the other hand also has a high corrosion resistance and other resistance in the finished touch sensor configuration. This property is brought about by the $Mo_xTa_y$ with $0.02 \leq y \leq 0.15$ being good in terms of being worked in the usual chemical processes that are used in wet-chemical etching, but on the other hand having a high resistance in respect of the corrosion processes and atmospheric oxidation processes that usually occur undesirably and take place under other ambient conditions and with other pH values. With the layer of $Mo_xTa_y$ with $0.02 \leq y \leq 0.15$, the stress conditions on the substrate can also be controlled very well during the production of the touch sensor configuration, so that distortion of the substrate can be avoided and good layer adherence can be achieved. In particular in the case of a multilayer structure of the contacting structure with at least one further layer of Al or an Al alloy in a proportion of $Al \geq 90$ atomic percent (in particular for example AlNd alloy), which causes a tensile stress in a plane parallel to the substrate surface, the layer of $Mo_xTa_y$ with $0.02 \leq y \leq 0.15$ brings about good stress compensation in the layer structure as a whole. In comparison with a layer of $Mo_aNb_b$, for example, a lower resistance of the contacting structure is provided by the layer of $Mo_xTa_y$, the etching behavior and the corrosion resistance are significantly improved and improved stress compensation is achieved in the layer structure as a whole.

It is preferred for the layer of $Mo_xTa_y$ that: $0.03 \leq y \leq 0.09$. It has been found that, with this relationship in particular, the advantages described above are achieved to a particularly high degree.

According to one configuration, the contacting structure is of a multilayer structure and has at least one layer of Al or Cu or Ag or Au or Al alloy (with an Al content $\geq 90$ atomic percent) or Cu alloy (with a Cu content $\geq 90$ atomic percent) or Ag alloy (with an Ag content $\geq 90$ atomic percent) or Au alloy (with an Au content $\geq 90$ atomic percent). In this case, a particularly high electrical conductivity of the contacting structure is achieved by the at least one layer of Al, Cu, Ag or Au or the alloys thereof and the electrical connection to the electrically conductive, transparent layer is produced by the layer of $Mo_xTa_y$. With the $Mo_xTa_y$ layer formed between the substrate and the layer of Al, Cu, Ag, Au or the alloys thereof, improved adherence on the substrate is also achieved in particular. The contacting structure may in this case preferably have a two-layer or three-layer structure. In the case of Cu alloys, alloys with Mg, Ca and/or Mn may be used in particular. The layer of $Mo_xTa_y$ provides the described advantageous etching behavior and the high corrosion resistance and other resistance of the contacting structure. Particularly preferred is a layer structure of the contacting structure with at least one layer of Al or an Al alloy with an Al content $\geq 90$ atomic percent, in particular AlNd alloy, and the at least one layer of $Mo_xTa_y$. In this case, the at least one layer of $Mo_xTa_y$ protects the layer of Al or Al alloy reliably from the formation of an insulating surface layer of aluminum oxide and ensures reliable electrical contacting of the electrically conductive, transparent layer. Particularly in the case of this combination, the layer of $Mo_xTa_y$ achieves particularly advantageous compensation for the stresses introduced by the layer of Al or Al alloy and suppresses the formation of undesired deformations of the surface, such as for example so-called hillocks. In a particularly preferred configuration, the contacting structure has a two-layer structure with a layer of Al or Al alloy and the layer of $Mo_xTa_y$, or a three-layer structure with a layer of $Mo_xTa_y$, a layer of Al or Al alloy and a further layer of $Mo_xTa_y$.

According to one configuration, the contacting structure of the touch sensor configuration has at least one contact terminal for the connection to an electronic activation and evaluation unit and an exposed surface of the contact terminal is formed by the at least one layer of $Mo_xTa_y$ with $0.02 \leq y \leq 0.15$. Since electrical connection to an electronic evaluation unit is required for the touch sensor configurations and this electrical connection is generally only formed completely in a working step that takes place at a time well after the touch sensor configuration is formed, in these cases a number of contact terminals are generally required. Since the contact terminals are exposed to very different ambient conditions (often also over relatively long periods of time, for example during storage and/or transport), they must have not only high electrical conductivity but also high corrosion resistance and other resistance, which is achieved by the at least one layer of $Mo_xTa_y$. The at least one layer of $Mo_xTa_y$ on the exposed surface of the at least one contact terminal allows undesired corrosion to be prevented at this location. Furthermore, the desired configuration of contact terminals can in this case be performed in the same process step as the formation of the contacting structure, so that an efficient production process with few steps is made possible.

According to one configuration, the touch sensor configuration forms part of a touch sensor screen (touchscreen). Particularly in this case, the touch sensor configuration is exposed to loads due to environmental influences, such as for example corrosion, moisture, perspiration or mechanical effects, to a great extent during operation. A high corrosion resistance and other resistance is achieved for this application in particular by the claimed configuration of the touch sensor configuration.

According to one configuration, the touch sensor configuration has a plurality of touch sensor elements arranged in a grid. Particularly in the case of such a configuration, the contacting structure must provide contacting of the number of touch sensor elements that is resistant and has good electrical conductivity, which is achieved by the claimed combination of features. "Arranged in a grid" is understood here as meaning that the touch sensor elements are arranged in a predetermined pattern at various locations on the surface of the substrate. However, the pattern is not restricted here to an orthogonal configuration (for example in the manner of a checkerboard).

According to one configuration, the at least one electrically conductive, transparent layer has a transparent conductive oxide (TCO, transparent conducting oxide), a transparent, conductive polymer or a coating of carbon nano-tubes. On account of their optical transparency and electrical conductivity, these materials are particularly suitable for the configuration of touch sensor configurations that are used in touch-sensitive screens. Indium tin oxide (ITO), indium zinc oxide (IZO), aluminum zinc oxide (AZO) or antimony tin oxide may be used here in particular as transparent conductive oxides. It has been found that the at least one layer of $Mo_xTa_y$ shows the described advantageous properties in particular when contacting with these materials.

According to one configuration, the rear side of the optically transparent substrate, facing away from the touch sensor configuration, forms a substrate for at least one component of a liquid crystal display. In this case, a so-called "in-cell" touch sensor configuration is provided, in the case of which the touch sensor configuration does not have a separate substrate with respect to a screen located thereunder. Particularly in the case of such a configuration, the avoidance of undesired stresses in the substrate is important, and is achieved by the specified touch sensor configuration, as described above. However, it is also possible, for example, to form the touch sensor configuration and the at least one component of the liquid crystal display on the same side of the substrate, preferably on the side that does not form the outer side during operation.

The sputtering target is used for forming a contacting structure in direct contact with an electrically conductive, transparent layer of an optically transparent touch sensor element of a touch sensor configuration that is formed on an optically transparent substrate. The sputtering target contains $Mo_xTa_y$ with $0.02 \leq y \leq 0.15$. Use of this sputtering target for forming the contacting layer allows the contacting layer to be created by deposition on the substrate by cathode sputtering. In this case, a high electrical conductivity of the contacting structure is achieved with low electrical transfer resistance in relation to the electrically conductive, transparent layer, good corrosion resistance and other resistance of the contacting structure as well as excellent compensation for stresses in a plane parallel to the surface of the substrate. This is achieved to a particularly great extent if: $0.03 \leq y \leq 0.09$. The object is also achieved by the use of an etching solution for structuring a contacting structure for contacting an electrically conductive, transparent layer. The contacting structure has at least one layer of $Mo_xTa_y$ with $0.02 \leq y \leq 0.15$. The etching solution has phosphoric acid and/or acetic acid and/or nitric acid as solution constituents. The proportion of phosphoric acid is preferably 60-90 percent by weight, the proportion of acetic acid is preferably 0-20 percent by weight and the proportion of nitric acid is preferably 1-12 percent by weight. The possibly remaining proportion may be formed by water and possibly wetting agent (for example a fluoride-containing compound or an anionic additive).

Other features which are considered as characteristic for the invention are set forth in the appended claims.

Although the invention is illustrated and described herein as embodied in a touch sensor configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
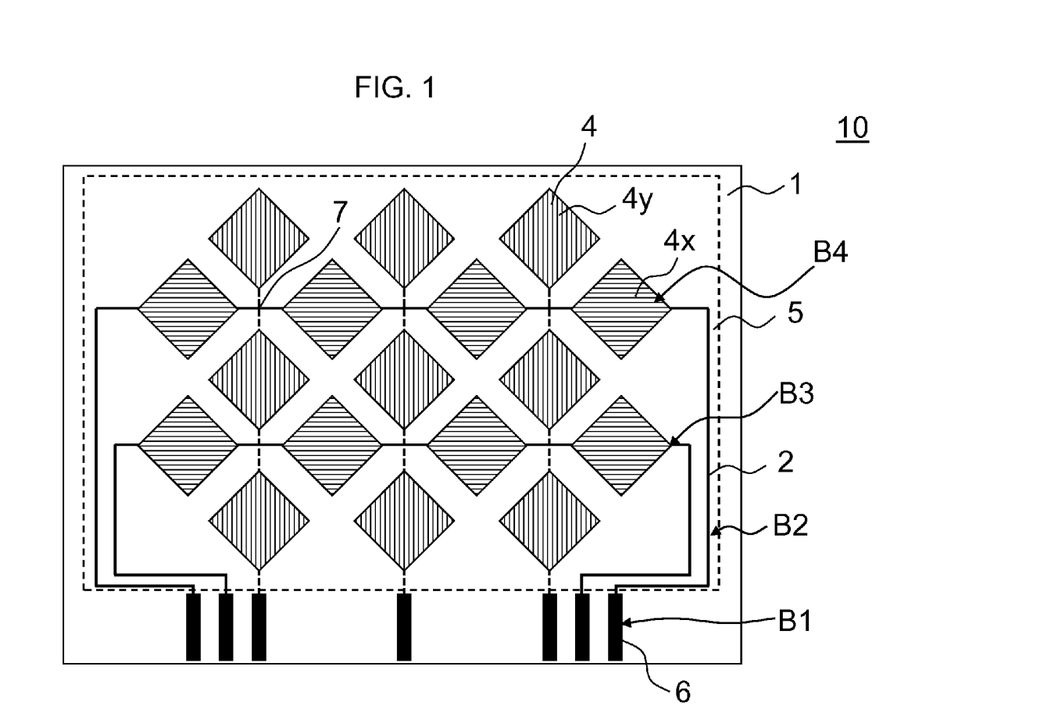
FIG. 1 is a diagrammatic, plan view of a structure of a touch sensor configuration according to a first embodiment of the invention.
Figure 2:
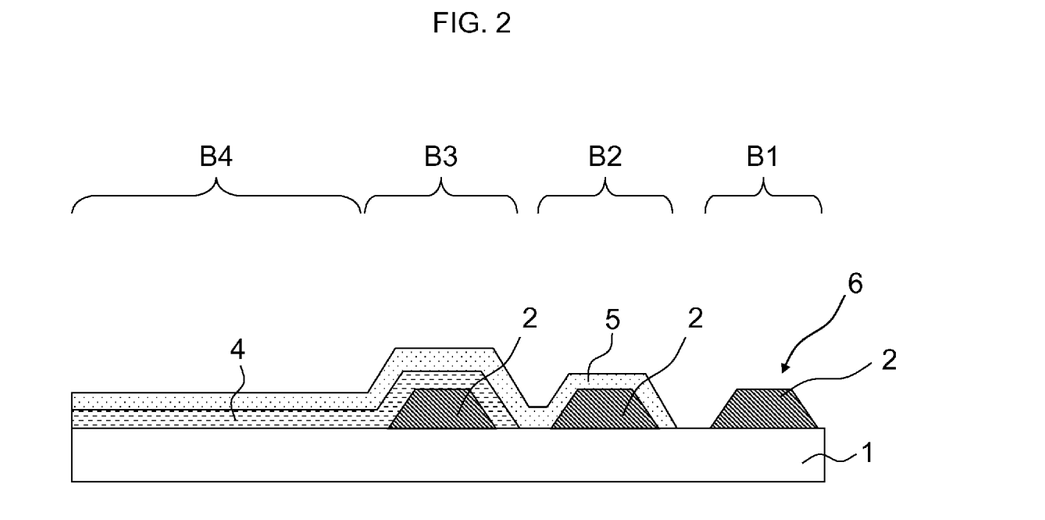
FIG. 2 is a diagrammatic, illustration showing various regions of the touch sensor configuration in a view perpendicular to a surface of a substrate.

Referring now to the figures of the drawing in detail and first, particularly, to FIGS. 1 and 2 thereof, there is shown a first embodiment of the present invention. In the case of the first embodiment, a touch sensor configuration 10 forms part of a touch sensor screen (touchscreen). In the case of the embodiment represented, the touch sensor configuration is configured as a so-called "in-cell" touch sensor configuration, in which an optically transparent substrate 1 of the touch sensor configuration 10 at the same time forms the color filter substrate of an LCD screen. A rear side of the optically transparent substrate 1, facing away from the touch sensor configuration, consequently forms a substrate for at least one component of a liquid crystal display. However, the way in which the touch sensor configuration is implemented is not restricted to such a configuration. The substrate 1 may, for example, also be formed as a separate substrate, for example of glass or transparent plastic, and may be formed, for example, as a rigid plate or a flexible sheet. However, in all these cases the optically transparent substrate 1 consists of an electrically insulating material.

In the case of the embodiment represented, the touch sensor configuration 10 is formed in such a way that a plurality of touch sensor elements, which in FIG. 1 are shown as square for example, are arranged in the form of a measuring area on the surface of the substrate 1. However, the touch sensor configuration is not restricted to such a configuration. In the case of the example, the touch sensor configuration is a configuration for capacitive sensing. In the case of the exemplary embodiment represented, the function and structure of the touch sensor configuration correspond substantially to that described in U.S. patent publication 2009/0160824 A1, but the configuration is not restricted to this structure. For example, it is also possible to configure the touch sensor configuration for resistive sensing.

In the case of the embodiment represented, the two conductive layers (electrodes) required for the capacitive sensing on the same side of the substrate are structured in a checkerboard-like pattern in a grid of rows and columns. On account of the structuring, a plurality of touch sensor elements are consequently formed, forming the two electrodes for capacitive sensing. The two electrodes of the capacitive touch sensor configuration 10 are produced from the same material, that is to say from an electrically conductive, optically transparent layer 4. To illustrate this clearly, the two electrodes are shown in FIG. 1 as shaded differently. The touch sensor elements 4x of one electrode side are shown as shaded horizontally and the touch sensor elements 4y of the other electrode side are shown as shaded vertically. The touch sensor elements 4x are connected to one another in an electrically conducting manner in the (horizontal) rows by way of their respective corners (as schematically represented in FIG. 1 by solid lines). The touch sensor elements 4y are likewise connected to one another in an electrically conducting manner in the vertical columns by way of their respective corners (as schematically represented in FIG. 1 by dashed lines). The connection of the individual touch sensor elements may in this case be formed, for example, from the material of the touch sensor elements 4x, 4y, that is to say from the electrically conductive, transparent layer 4, or for example from the material of the contacting structure, which is described below. In the case of the exemplary embodiment, the electrically conductive, transparent layer 4 is produced from a transparent conductive oxide (TCO, transparent conducting oxide), which is applied to the substrate by way of cathode sputtering (sputter deposition). The conductive, transparent layer 4 may be formed in particular from indium tin oxide (ITO), indium zinc oxide (IZO), aluminum zinc oxide (AZO) or antimony tin oxide. However, it is also possible for example to form the conductive, transparent layer 4 from an electrically conductive polymer film. In regions 7, in which the connections of the columns and the connections of the rows cross, they are formed in each case as electrically insulated with respect to one another, which may be implemented, for example, by an electrically insulating layer arranged in between.

The respective rows of the touch sensor elements 4x are connected by way of an electrically conducting contacting structure 2 to contact terminals 6, which are respectively formed by a region of the contacting structure 2. Similarly, the respective columns of the touch sensor elements 4y are connected by way of the contacting structure 2 to further contact terminals 6, which are likewise respectively connected by a region of the contacting structure. The contact terminals 6 are formed for the purpose of providing an electrical connection to an electronic activation and evaluation unit, by way of which respective voltages can be applied to the electrodes of the touch sensor elements 4x, 4y, in order to detect touching of the touch sensor configuration 10 and evaluate it with respect to its position. The contact terminals 6 are, for example, formed as regions to which connecting cables on the touch sensor configuration 10 can be attached, for example by soldering or brazing, adhesive attachment with an electrically conductive adhesive, bonding, etc.

The structure of the individual components of the touch sensor configuration 10 is described in more detail below with reference to FIG. 2. In FIG. 2, various regions B1, B2, B3 and B4 of the touch sensor configuration 10 are represented. The region B1 is located in the region of the contact terminals 6. The region B2 is a region in which the contacting structure 2 is formed, but not the electrically conductive, transparent layer 4. The region B3 is located where the contacting structure 2 is made to contact the electrically conductive, transparent layer 4. The region B4 is located where no contacting structure is formed, but only the electrically conductive, transparent layer 4.

In the region B1, the contact terminals 6 are formed on the substrate 1 from the material of the contacting structure 2. The contact terminals 6 are produced from a layer of $Mo_xTa_y$ with $0.02 \leq y \leq 0.15$, which is applied to the substrate by cathode sputtering. In this region B1, the surface of the contact terminals 6 is exposed for later electrical contacting.

In the region B2, the layer of $Mo_xTa_y$ with $0.02 \leq y \leq 0.15$ is deposited on the substrate 1, in order to form the contacting structure 2 for the contacting of the touch sensor elements 4x, 4y. Deposited on this layer is an optically transparent protective layer 5, which may, for example, consist of silicon nitride. The protective layer 5 may, for example, be deposited by chemical vapor deposition (CVD) after the formation of the contacting structure 2 with the contact terminals 6 and the electrically conductive, transparent layer 4.

In the region B3, the contacting structure 2 contains the layer of $Mo_xTa_y$ with $0.02 \leq y \leq 0.15$ is deposited on the substrate 1 and, in direct contact with it, the electrically conductive, transparent layer 4. The electrically conductive, transparent layer 4 is applied, for example, by cathode sputtering. In this region B3, the contacting structure 2 and the electrically conductive, transparent layer 4 are covered on the side facing away from the substrate 1 by the protective layer 5.

In the region B4 there is the at least one touch sensor element. In this region B4, the electrically conductive, transparent layer 4 is deposited on the substrate 1 and this layer is covered on the side facing away from the substrate 1 by the protective layer 5.

In a production process for creating the described touch sensor configuration, the contacting structure 2 and the contact terminals 6 are deposited on the substrate 1 by cathode sputtering (sputter deposition). In the deposition, a sputtering target with a target area consisting of $Mo_xTa_y$ with $0.02 \leq y \leq 0.15$ is used. By providing the $Mo_xTa_y$ in the form of a sputtering target, low-cost cathode sputtering can be used as a coating method for creating the structures. By appropriate selection of the depositing conditions, excellent adherence of the contacting structure 2 and the contact terminals 6 on the substrate 1 can be achieved, in particular when it is a glass substrate. An example of suitable depositing conditions is, for example, direct-current cathode sputtering (DC sputtering) with a DC voltage power density of 5-10 W/cm$^2$, argon working gas with a pressure of $2.5 \times 10^{-3}$ to $7.5 \times 10^{-3}$ mbar and a substrate temperature between room temperature and 150° C.

In the production process, the electrically conductive, transparent layer 4 and the layer of $Mo_xTa_y$ are structured by photolithography in combination with a wet-chemical etching process. The etching preferably takes place in this case with an etching solution of phosphoric acid and nitric acid and possibly acetic acid (PAN etching solution). The proportion of phosphoric acid is in this case preferably 60-90 percent by weight, the proportion of nitric acid is preferably 1-12 percent by weight, the proportion of acetic acid is preferably 0-20 percent by weight, and the remaining proportion is formed by water, it also being possible for a wetting agent (for example a fluoride-containing compound or an anionic additive) to be contained. The protective layer 5 is structured by wet or plasma etching.

In a use of the touch sensor configuration 10, voltages are applied in a known way to the touch sensor elements 4x, 4y by an electronic evaluation and control unit. The electronic evaluation and control unit senses changes in capacitance that are caused by the touch sensor elements 4x, 4y being touched or approached by a finger, a tracer or some other object, and the x/y coordinates of the user input on the touch sensor configuration are calculated from this in a likewise known way.

In the case of the first embodiment, the structure of the touch sensor configuration is simplified in comparison with known touch sensor configurations in which the contacting structure has a multilayer structure.

Figure 3:
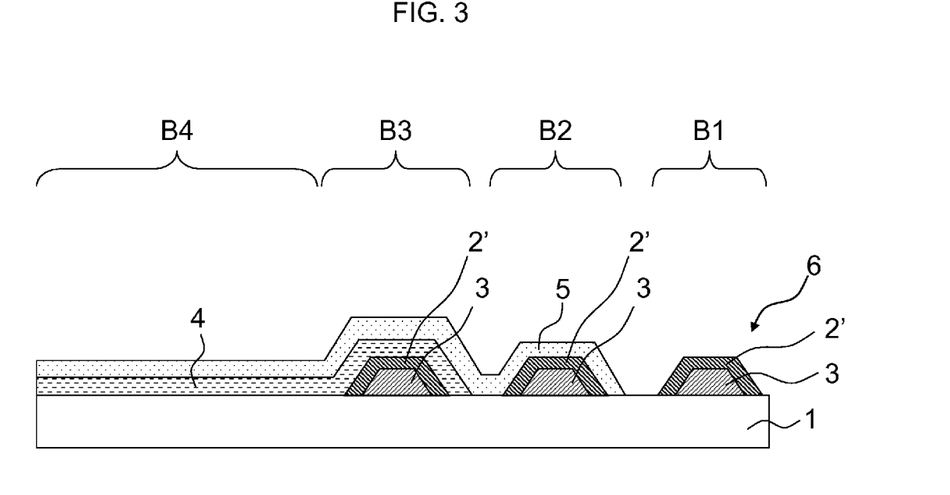
FIG. 3 is a diagrammatic, illustration showing the various regions of the touch sensor configuration in a case of a second embodiment according to the invention.

A second embodiment is described below with reference to FIG. 1 and FIG. 3. The second embodiment differs from the first embodiment only in the structure of the contacting structure. To avoid repetition, only the differences from the first embodiment are described below. The same designations are retained for the same components.

As a difference from the first embodiment, in which the contacting structure 2 is formed only by a layer of $Mo_xTa_y$ with $0.02 \leq y \leq 0.15$, the contacting structure 2', 3 in the case of the second embodiment has a multilayer structure. In the case of the example represented in FIG. 3, the contacting structure has a layer 3 and, formed thereupon, a layer 2' of $Mo_xTa_y$ with $0.02 \leq y \leq 0.15$. The layer 3 is formed from Al, Cu, Au, Ag, an Al alloy with a proportion of $Al \geq 90$ atomic percent, a Cu alloy with a proportion of Cu 90 atomic percent, an Au alloy with a proportion of $Au \geq 90$ atomic percent or an Ag alloy with a proportion of $Ag \geq 90$ atomic percent. The layer 3 is preferably formed from Al or an Al alloy. The layer 3 is deposited on the substrate by cathode sputtering. The layer 2' of $Mo_xTa_y$ with $0.02 \leq y \leq 0.15$ is deposited on the metallic layer 3 by cathode sputtering.

With the touch sensor configuration according to the second embodiment, substantially the same advantages as with the first embodiment are achieved and are described in still more detail below. In the case of the solution according to the second embodiment, however, it is possible to provide the contacting structure with an increased conductivity in comparison with the first embodiment, since the layer 3 provides a higher conductivity than the layer of $Mo_xTa_y$ with $0.02 \leq y \leq 0.15$. For example, a 300 nm thick $Mo_xTa_y$ layer has a resistivity of about 11 μohmcm and a layer containing two layers, a 250 nm thick Al layer and a 50 nm thick $Mo_xTa_y$ layer, has a resistivity of about 3.5 μohmcm.

According to a modification of the second embodiment, the contacting structure has a three-layer structure, in which a layer of $Mo_xTa_y$ with $0.02 \leq y \leq 0.15$ is deposited on the substrate, and the layer 3 (as described in the case of the second embodiment) is deposited on this layer and the further layer 2' of $Mo_xTa_y$ with $0.02 \leq y \leq 0.15$ is deposited on the metallic layer 3. With a multilayer structure, the layer structure according to the modification achieves particularly good adherence on the substrate 1, in particular if the substrate 1 consists of glass.

The advantages achieved with the solution according to the invention are explained in still more detail below. A high corrosion resistance to atmospheric moisture, water, perspiration, etc. is achieved by the provided touch sensor configuration with the contacting structure 2, which has at least one layer of $Mo_xTa_y$ with $0.02 \leq y \leq 0.15$. Furthermore, a high oxidation resistance to atmospheric oxygen and other oxidizing substances in the ambient air is achieved. At the same time, good structurability by conventional wet-chemical etching processes in combination with photolithography techniques is provided. The contacting structure provides a high electrical conductivity and good adherence on the material of the substrate 1. Good electrical contacting with a low transfer resistance in relation to the electrically conductive, transparent layer 4 is achieved by the layer of $Mo_xTa_y$ with $0.02 \leq y \leq 0.15$. On account of the deposition of the layer of $Mo_xTa_y$ with $0.02 \leq y \leq 0.15$ by cathode sputtering (sputter deposition), the deposition is performed in a stable, easy-to-control and low-cost coating process that is available even for large-area substrates.

The production process for the overall touch sensor configuration takes place using customary thin-film technology. The layers are first coated over a large area onto the substrate by PVD (physical vapor deposition) or CVD (chemical vapor deposition) processes and subsequently structured (in each case) by photolithography processes. The required etching step may in this case take place, for example, wet-chemically or by a dry-etching process, a wet-chemical etching process mainly coming into consideration for the metallic layers. The wet-chemical etching may in this case be performed, for example, by mixtures of phosphoric acid and nitric acid or mixtures of phosphoric acid, nitric acid and acetic acid. For the case where there is at least one layer of Al or an Al alloy, this involves the following processes in particular:

$$6HNO_3 \rightarrow 6H^+ + 6NO_3^- \quad (R1)$$

$$2Al + 6H^+ \rightarrow 2Al^{3+} + 3H_2(\uparrow) \quad (R2)$$

$$Al + NO_3^- + 4H^+ \rightarrow Al^{3+} + NO(\uparrow) + 2H_2O \quad (R3)$$

$$H_3PO_4 + 2H_2O \rightarrow 2H_3O^+ + HPO_4^{2-} \quad (R4)$$

$$2Al^{3+} + 3HPO_4^{2-} \rightarrow Al_2(HPO_4)_3 \rightarrow 2AlPO_4 + H_3PO_4 \quad (R5)$$

During the wet-chemical etching process, the metallic layer is oxidized, either by protons ($H^+$ ions) of the acid, as specified in equation R2, or by nitrate ions, as specified in equation R3. The oxidized, dissolved metal species is stabilized in the solution by phosphate ions, as specified in equation R5.

From a chemical viewpoint, the undesired corrosion or atmospheric oxidation that is intended to be avoided and the wet etching that is required for the production process are the same processes, which however take place under different ambient and pH conditions. While corrosion and atmospheric oxidation are intended to take place at a reaction rate that is as slow as possible, or not to take place at all, the oxidation process during the wet-etching and structuring process is desired and the reaction should take place at a sufficiently high rate. The $Mo_xTa_y$ with $0.02 \leq y \leq 0.15$ that is used for the formation of the contacting structure meets these conflicting requirements.

The layer of $Mo_xTa_y$ with $0.02 \leq y \leq 0.15$ in this case also provides high electrical conductivity. When the contacting structure is formed with a multilayer structure and, in particular, with a layer of Al or Al alloy, the layer of $Mo_xTa_y$ with $0.02 \leq y \leq 0.15$ also prevents the formation of an insulating aluminum oxide layer on the surface thereof. In particular in the case of such a multilayer structure, the layer of $Mo_xTa_y$ with $0.02 \leq y \leq 0.15$ also brings about excellent stress compensation in the layer structure. A tensile stress introduced into the substrate and into the layer structure through the layer of Al or Al alloy and acting in a plane parallel to the substrate surface is compensated particularly advantageously by a compressive stress introduced by way of the layer of $Mo_xTa_y$ with $0.02 \leq y \leq 0.15$ and likewise acting in the plane parallel to the substrate surface. Consequently, resultant strains and/or deformations of the substrate are efficiently avoided.

Although an implementation of the touch sensor configuration in which the touch sensor configuration is arranged on the surface that is lying on the outside during operation has been described above with reference to the embodiments, it is also possible, for example, to arrange the touch sensor configuration on the opposite, rear side of the substrate. Although a so-called implementation in which both electrodes are arranged on the same side of the substrate has been described here, it is also possible, for example, for one electrode to be arranged on one side of the substrate and the other to be arranged on the opposite side of the substrate.

Although an implementation in which the electrodes of the touch sensor configuration are arranged on the surface of the substrate in a checkerboard pattern has been described with reference to the embodiments, they may, for example, also be arranged in some other pattern or grid. Furthermore, it is also possible for the electrodes not to be arranged next to one another on the substrate surface, as in the case of the exemplary embodiments, but one above the other, separated from one another by an insulating layer. In this case, the electrodes may be implemented, for example, over a large area or else have a structuring in, for example, an x/y grid. Also possible in particular in this case is such a configuration in a grid with many touch sensor elements, with which it is possible for touching at various locations to be sensed simultaneously (so-called multi-touch implementation).

Although an implementation in which the contacting structure is deposited on the substrate and the at least one electrically conductive, transparent layer of the touch sensor is partially deposited on the contacting structure has been described with reference to the embodiments, also possible, for example, is a converse configuration, in which the contacting structure is partially deposited on the electrically conductive, transparent layer. In other words, it is possible when forming and structuring the layer structure to choose a favorable sequence, which also takes into consideration in particular the selectivity in the etching process for the structuring.

The invention claimed is:

1. A touch sensor configuration, comprising:
   an optically transparent substrate;
   at least one optically transparent touch sensor element formed on said substrate and having at least one electrically conductive, transparent layer; and
   at least one contacting structure for electrical contacting of said electrically conductive, transparent layer, said contacting structure having in direct contact with said electrically conductive, transparent layer at least one layer of $Mo_xTa_y$ with $0.02 \leq y \leq 0.15$.

2. The touch sensor configuration according to claim 1, wherein $0.03 \leq y \leq 0.09$.

3. The touch sensor configuration according to claim 1, wherein said contacting structure is of a multilayer structure and has at least one layer of Al, Cu, Ag, Au, an Al alloy with an Al content $\geq 90$ atomic percent, a Cu alloy with a Cu content $\geq 90$ atomic percent, an Ag alloy with an Ag content $\geq 90$ atomic percent or an Au alloy with an Au content $\geq 90$ atomic percent.

4. The touch sensor configuration according to claim 1, wherein said contacting structure has at least one contact terminal for connection to an electronic activation and evaluation unit and an exposed surface of said contact terminal is formed by said at least one layer of $Mo_xTa_y$ with $0.02 \leq y \leq 0.15$.

5. The touch sensor configuration according to claim 1, wherein the touch sensor configuration forms part of a touch sensor screen.

6. The touch sensor configuration according to claim 1, wherein said optically transparent touch sensor element is one of a plurality of touch sensor elements disposed in a grid.

7. The touch sensor configuration according to claim 1, wherein said at least one electrically conductive, transparent layer has one of a transparent conductive oxide, a transparent, conductive polymer or a coating of carbon nano-tubes.

8. The touch sensor configuration according to claim 1, wherein said optically transparent substrate has a rear side facing away from the touch sensor configuration, and forms a substrate for at least one component of a liquid crystal display.

9. A method, which comprises the step of:
forming, via a sputtering target, a contacting structure in direct contact with an electrically conductive, transparent layer of an optically transparent touch sensor element of a touch sensor configuration that is formed on an optically transparent substrate, the sputtering target containing $Mo_xTa_y$ with $0.02 \leq y \leq 0.15$.

10. The method according to claim 9, which further comprises setting y in the range of $0.03 \leq y \leq 0.09$.

11. A method, which comprises the step of:
providing and using an etching solution for structuring a contacting structure for contacting an electrically conductive, transparent layer, the contacting structure having at least one layer of $Mo_xTa_y$ with $0.02 \leq y \leq 0.15$ and the etching solution having at least one of phosphoric acid, acetic acid or nitric acid as solution constituents.

12. The method according to claim 11, which further comprises setting a proportion of phosphoric acid to be 60-90 percent by weight, a proportion of acetic acid to be 0-20 percent by weight and a proportion of nitric acid to be 1-12 percent by weight.

* * * * *